US006991447B2

(12) United States Patent
LeClare et al.

(10) Patent No.: US 6,991,447 B2
(45) Date of Patent: Jan. 31, 2006

(54) PLEATING MACHINE

(75) Inventors: Harold G. LeClare, Lenexa, KS (US); Kevin E. Welch, Overland Park, KS (US); Kevin L. Egbert, Lenexa, KS (US); Andrew R. Elliott, Shawnee, KS (US); James P. Morris, Kansas City, MO (US); Gary R. Hannah, Shawnee, KS (US)

(73) Assignee: BE Intellectual Property, Inc., Wellington, FL (US)

( * ) Notice: Subject to any disclaimer, the term of this patent is extended or adjusted under 35 U.S.C. 154(b) by 260 days.

(21) Appl. No.: 10/205,043

(22) Filed: Jul. 24, 2002

(65) Prior Publication Data

US 2004/0017025 A1 Jan. 29, 2004

(51) Int. Cl.
*B29C 53/22* (2006.01)

(52) U.S. Cl. ....................... 425/303; 425/336; 425/393

(58) Field of Classification Search ................ 425/303, 425/336, 392–393, 326.1, 211, 456
See application file for complete search history.

(56) References Cited

U.S. PATENT DOCUMENTS

| | | | | |
|---|---|---|---|---|
| 4,459,095 A * | 7/1984 | Rohr et al. | ................. | 425/211 |
| 4,493,130 A * | 1/1985 | Urbutis et al. | ................ | 452/21 |
| 5,056,293 A * | 10/1991 | Richards et al. | .............. | 452/29 |
| 5,693,347 A * | 12/1997 | Hegler | ....................... | 425/233 |

* cited by examiner

*Primary Examiner*—Robert Davis
*Assistant Examiner*—Thu Khanh T. Nguyen
(74) *Attorney, Agent, or Firm*—Hovey Williams LLP

(57) ABSTRACT

A pleating machine (20) is provided which allows extremely rapid, uniform pleating of flexible, tubular bodies (28), thereby eliminating the arduous and time-consuming task of manual pleating. The machine (20) includes an upper, stationary, female tubular jaw (90) and a lower, reciprocal, male tubular pleating jaw (92) which are oriented in superposed, substantially axial alignment, along with a drive assembly (26) serving to vertically reciprocate lower jaw (92). An elongated rod-type body support (24) extends downwardly through the upper jaw (90) and presents a pleating surface (**88*a*), so that upon reciprocation of lower jaw (92), the jaw lugs (105) successively engage the body (28) to form pleats (162, 164). The pleats (162, 164) are retained by keeper structure including inwardly extending female jaw segments (98) and weighted slide (89) mounted on support (24**).

28 Claims, 6 Drawing Sheets

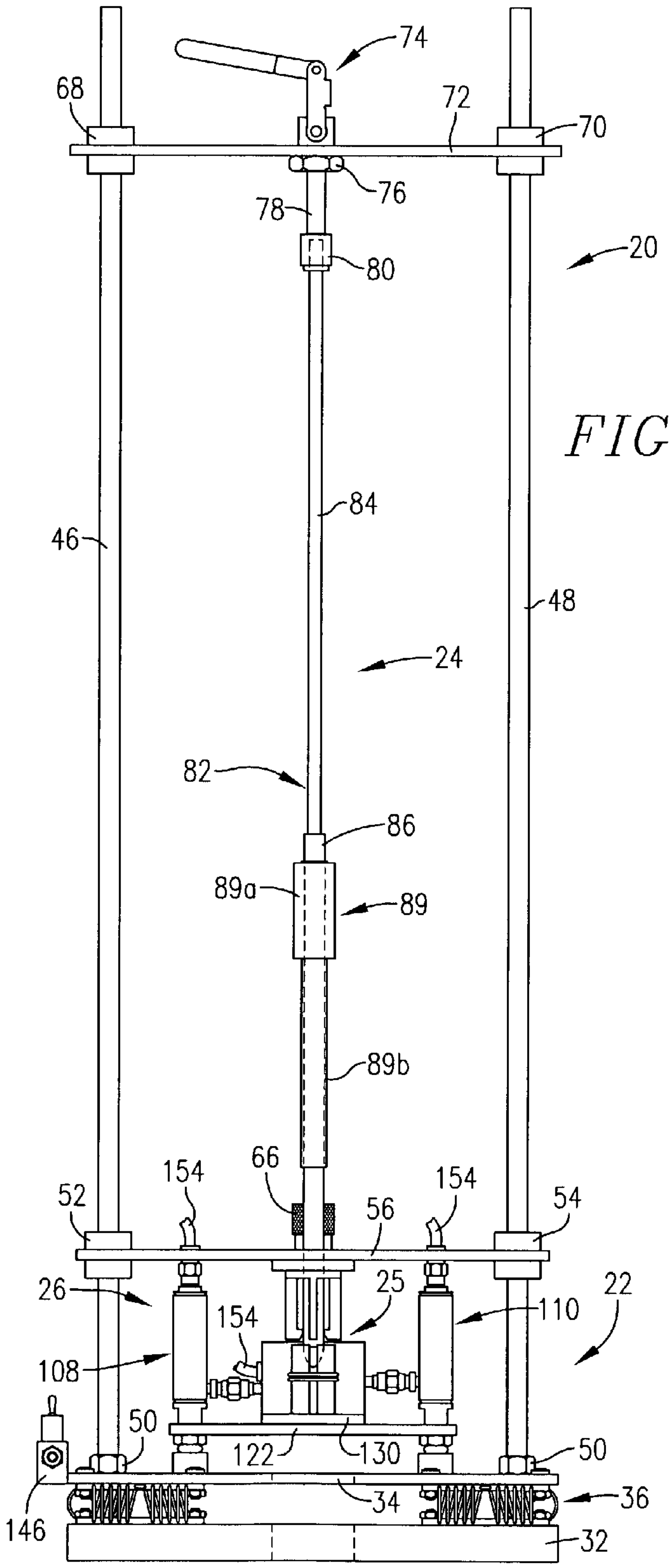
FIG. 1.
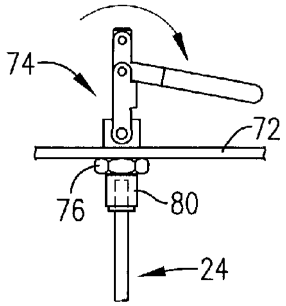
FIG. 8.
FIG. 7.
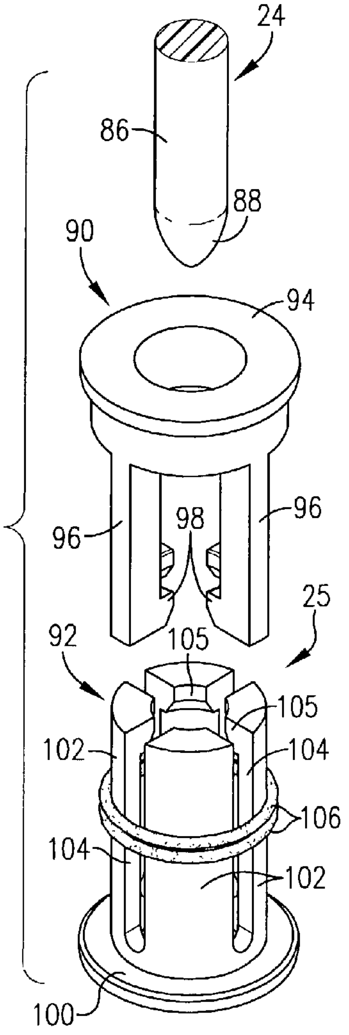

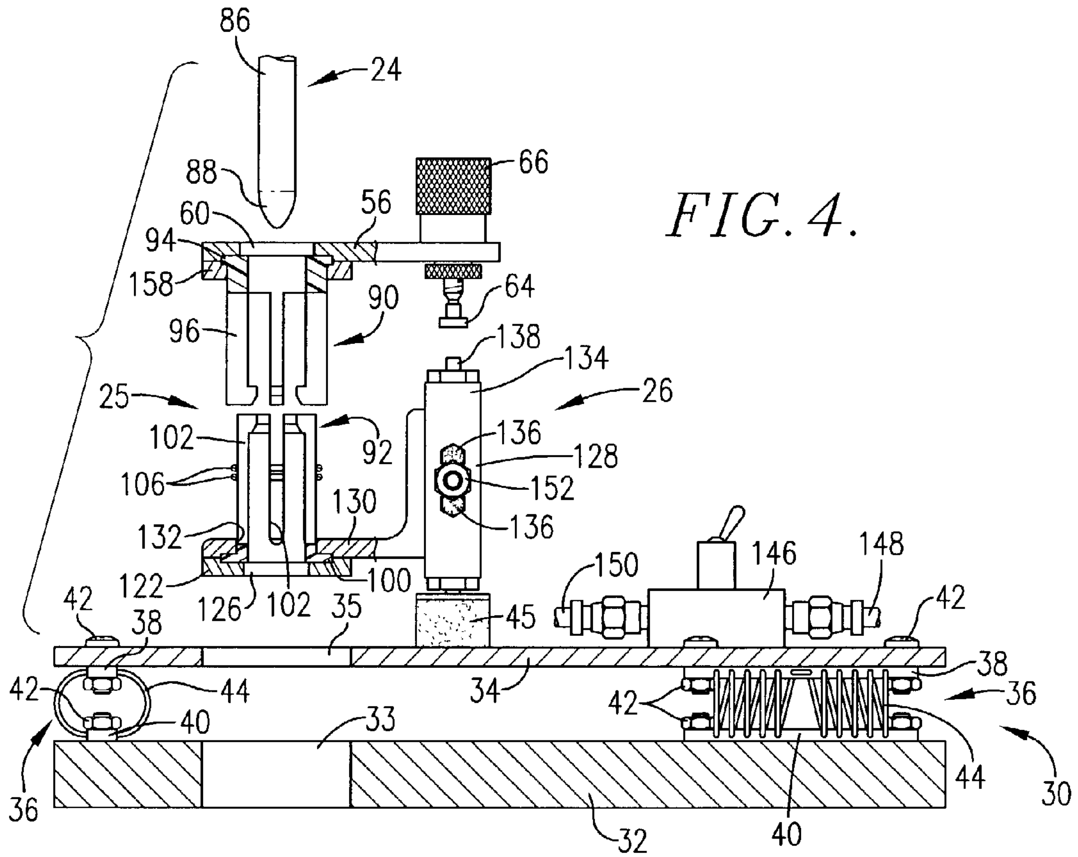
*FIG. 4.*
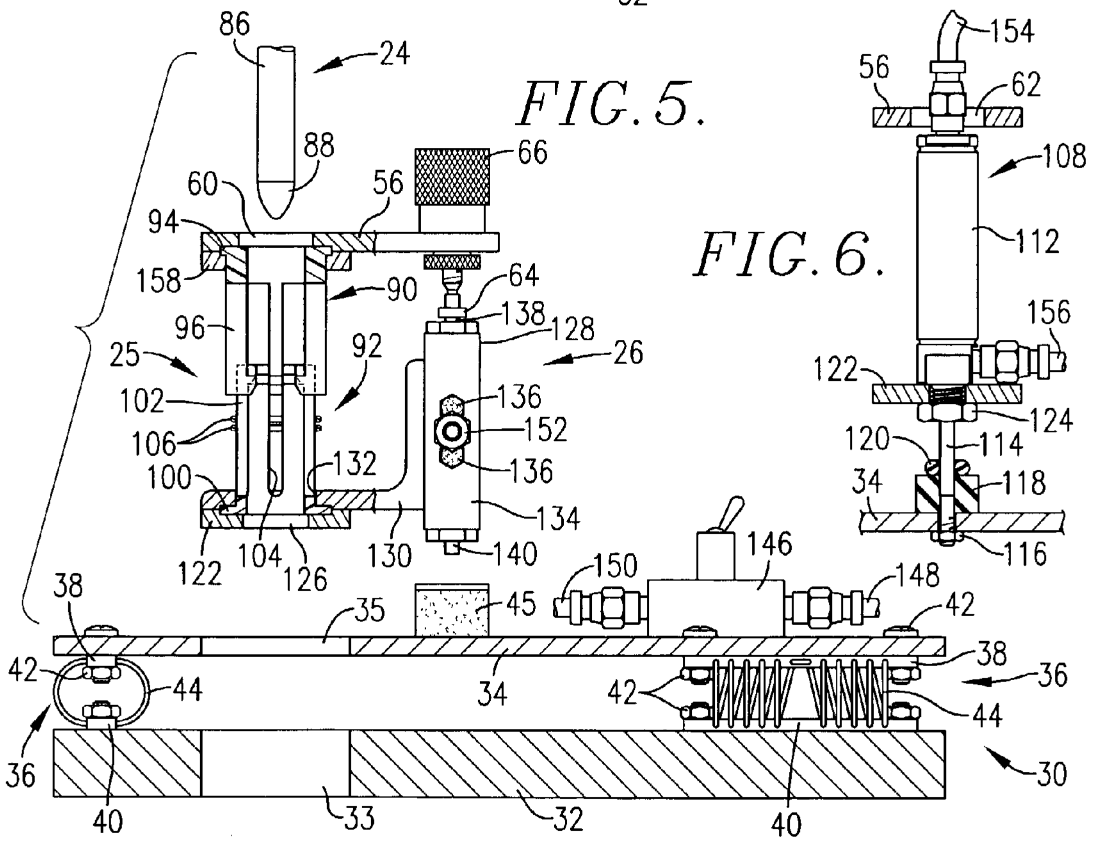
*FIG. 5.*
*FIG. 6.*

PLEATING MACHINE

BACKGROUND OF THE INVENTION

1. Field of the Invention

The present invention is broadly concerned with an improved pleating machine permitting rapid, uniform pleating of flexible tubular bodies, such as tubular braided fabric. More particularly, the invention is concerned with such pleating machines, and pleating methods, wherein the machine includes a pair of aligned, tubular pleating jaws together with a drive assembly for generating relative reciprocal movement between the jaws; during jaw movement, the tubular body is successively engaged and uniform pleats are formed.

2. Description of the Prior Art

In the production of certain types of aircraft crew oxygen masks, there is a need for a series of pneumatically expandable tubes which are used as mask harness components. For example, U.S. Patent No. 4,915,106 describes a crew mask of this type, wherein the harness tubes may be inflated to expand the tubes and thus facilitate rapid donning of the mask; once donned, the harness tubes are deflated so that the mask is firmly positioned on the user's head. Such expandable harness tubes are made up of a synthetic resin (e.g., silicone rubber) central tube surrounded by a braided fabric such as NOMEX (aramid fabric). The NOMEX restrains the radial expansion of the silicone tube, while permitting axial expansion thereof. However, in order to accomplish this result, the surround NOMEX is in a pleated condition when the inner tube is in its relaxed, unexpanded condition.

In the past, it has been necessary to manually pleat the NOMEX about a central silicone rubber tube. This has been done by workers who successively engage and shift small portions of the NOMEX to create the desired pleated condition. This is an arduous, time-consuming task, made more difficult by the fact that the pleats must be very uniform in order to insure proper operation of the harness tubes. Generally, when manual pleating is done by an experienced worker, each tube takes at least about 15–20 minutes to complete.

Mechanical pleating devices have been proposed in the past, but none are suited for pleating of tubular bodies such as flexible NOMEX. For example, U.S. Pat. No. 3,343,220 describes an apparatus for corrugating and compressing flexible plastic tubing. In use, a flexible tube is circumferentially compressed through the use of pressurized air, whereupon a shiftable piston is employed to complete the pleat. This is an excessively complex mechanism which would be difficult to use efficiently. U.S. Pat. No. 3,012,604 describes and apparatus for pleating paper tubes. In this device, a feed pipe conveys a workpiece to a corrugating station where radially movable jaws operate on the workpiece to create pleats. U.S. Pat. No. 5,064,598 describes a pleating device used to pleat continuous web materials in order to create filter inserts. Finally, U.S. U.S. Pat. Nos. 5,510,071, 5,560,941, 5,522,718, and 5,372,774 are all directed to devices for the production of rigid corrugated synthetic resin tubing.

There is accordingly a need in the art for a simplified apparatus designed for the rapid and efficient pleating of flexible tubular materials.

SUMMARY OF THE INVENTION

The present invention overcomes the problems outlined above and provides an improved pleating machine operable for pleating elongated flexible tubular bodies. Broadly speaking, pleating machines in accordance with the invention include a jaw assembly having a pair of tubular pleating jaws in substantial axial alignment, with a support operable to maintain a tubular body in a pleating position passing through the pleating jaws. A drive assembly is operably coupled with the jaw assembly for generating relative reciprocal movement between the jaws in order to successively engage the tubular body and form pleats therein. Keeper structure is also provided which is operable to retain the pleats upon formation thereof.

Preferably, the jaw assembly includes an upper, stationary female jaw and a mating, lower shiftable male jaw. Each of these jaws is of annular configuration with interfitting jaw legs. The shiftable lower jaw is reciprocated through a pneumatic piston and cylinder drive assembly, controlled through a switchable directional valve, preferably a reciprocating directional control valve. The male jaw includes a plurality of circumferentially spaced lugs which engage the tubular body, pushing a pleat thereof upwardly along the length of the inner support until the pleat passes inwardly extending keeper segments forming a part of the female jaw legs.

BRIEF DESCRIPTION OF THE DRAWINGS

FIG. 1 is a front elevational view of the preferred pleating machine in accordance with the invention;

FIG. 4 is an enlarged, fragmentary central vertical sectional view of the machine, illustrating the pleating jaws in the separated and open position thereof;

FIG. 5 is a view similar to that of FIG. 4, but depicting the pleating jaws in the closed, pleating position thereof;

FIG. 6 is an enlarged, vertical sectional view depicting one of the piston and cylinder assemblies forming a part of the drive assembly, in the extended position thereof;

FIG. 7 is an enlarged, exploded perspective view illustrating the pleating jaws and support rod;

FIG. 8 is a fragmentary view illustrating the preferred straight line clamp used for positioning of the support rod;

DETAILED DESCRIPTION OF THE PREFERRED EMBODIMENT

Figure 3:
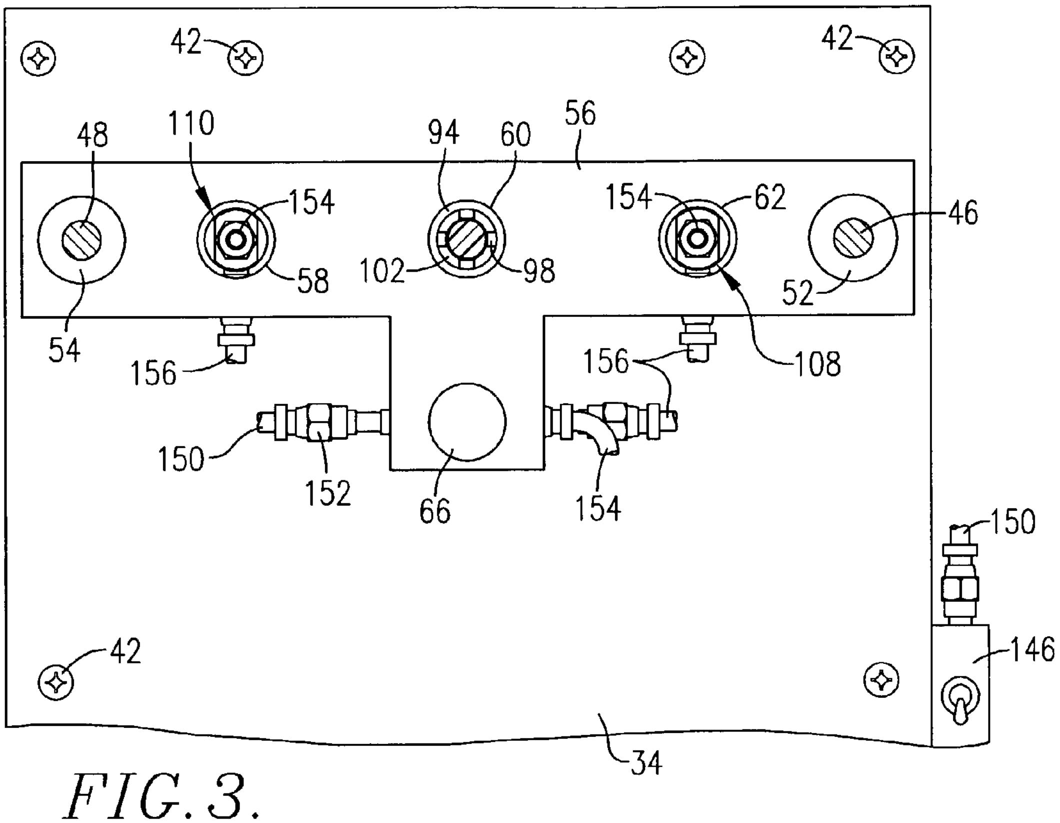
FIG. 3 is an enlarged, fragmentary sectional view taken along line 3—3 of FIG. 2.

Turning now to the drawings, a pleating machine 20 is illustrated in FIG. 1, and broadly includes a frame assembly 22, an elongated vertically extending tube support 24, jaw assembly 25, and drive assembly 26. The machine 20 is designed to efficiently pleat an elongated tubular body 28 of flexible material such as the above-described NOMEX material.

In more detail, the frame assembly 22 includes a base plate unit 30 including a lower base member 32 apertured as at 33, as well as an upper base plate 34 having an aperture 35 therethrough. A series of coil spring vibration dampeners 36 are used to interconnect the member 32 and plate 34, each of the dampeners 36 including respective upper and lower attachment plates 38, 40 secured to the plate 34 and member 32 via fasteners 42, as well as intermediate coil spring sections 44. A resilient valve stop 45 is secured to the upper face of plate 34 for purposes to be made clear.

Figure 2:
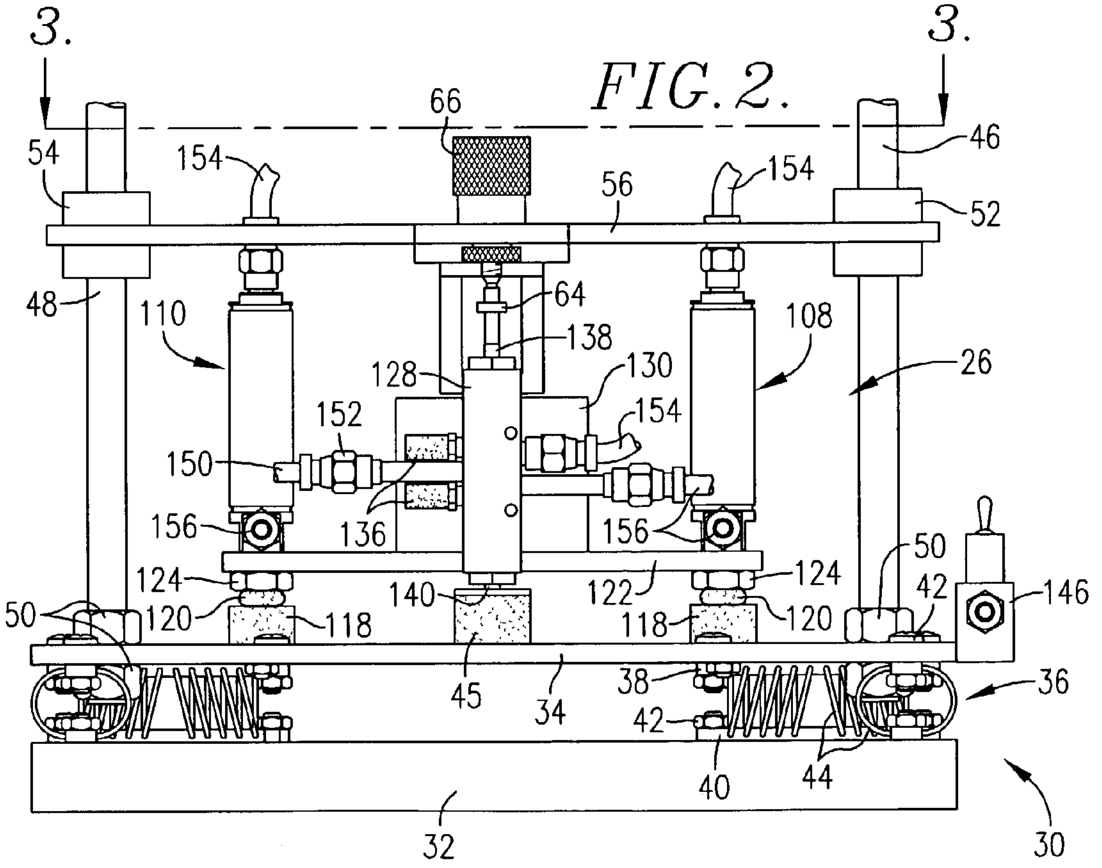
FIG. 2 is an enlarged, fragmentary rear view of the pleating machine, illustrating the pleating jaws and drive assembly.

The frame assembly 22 further includes a pair of laterally spaced apart upright threaded standards 46, 48 which are secured to plate 34 by means of nuts 50. The standards are equipped with a set of lower collars 52, 54 which support a horizontal, generally T-shaped stationary plate 56. As best seen in FIGS. 2 and 3, the plate 56 is provided with three spaced openings 58, 60, 62 between the collars 52, 54, as well as a valve stop 64 vertically adjustable by means of rotatable knob 66. A pair of upper collars 68, 70 are also secured to the standards 46, 48 and support a transversely extending, centrally apertured mount 72. A De-Sta-Co straight line clamp 74 is secured to mount 72 by way of nut 76, and has a downwardly extending leg 78 terminating in a friction fitting 80 (see FIGS. 1 and 8).

The tube support 24 is in the form of an elongated, stepped rod 82 presenting an uppermost section 84 of reduced diameter, as well as a lower section 86 of greater diameter, the latter terminating in a smoothly tapered and converging bullet lowermost end 88 presenting a pleating surface 88*a*. The upper end of section 84 is sized for a frictional fit connection within fitting 80, during use of the machine 20 as further described below. In use, the support 24 is also equipped with a weighted tubular slide 89 which is telescoped over the section 86 of the rod; the slide 189 has an annular weighted upper end 89*a* and a depending tubular segment 89*b*.

The jaw assembly 25 is made up of upper female and lower male tubular jaws 90, 92 which are in substantial axial alignment, with the jaw 90 being stationary and disposed above jaw 92. In more detail, the female jaw 90 includes an annular header section 94 with three circumferentially spaced apart legs 96 depending from the header section. The lowermost end of each leg 96 includes an inwardly extending keeper segment 98 which is important for purposes to be made clear. The lower male jaw 92 includes an annular base

100 with four upwardly extending, circumferentially spaced legs 102 separated by vertical recesses 104; the legs 102 include an inwardly extending engagement lugs 105. A pair of resilient O-rings 106 are located about the exterior surfaces of the legs 102 as best seen in FIG. 7. The legs 96 are sized and oriented so as to fit within the recesses 104 during pleating operations.

The drive assembly 26 includes a pair of laterally spaced apart pneumatic piston and cylinder assemblies 108, 110 each having a vertically oriented cylinder 112 and a downwardly extending piston rod 114. As best seen in FIG. 6, the lower end of each rod 114 is secured to base plate 34 by means of nut 116. A resilient bumper 118 and resilient O-ring 120 are disposed about rod 114, with the bumper 118 resting atop base plate 34. A cross plate 122 extends between the assemblies 108, 110, and is secured to the rods 114 by upper nut 124. The cross plate 122 includes a central opening 126 in registry with opening 60 of plate 56. A directional valve 128 also forms a part of the assembly 26 and is supported by means of an L-bracket 130. The lateral extent of the bracket 130 is secured to cross plate 122 and has a central opening 132 in registry with opening 126. The valve 128 is itself conventional and includes valve body 134 having exhaust ports 136 and upper and lower valve pins 138, 140.

Figure 9:
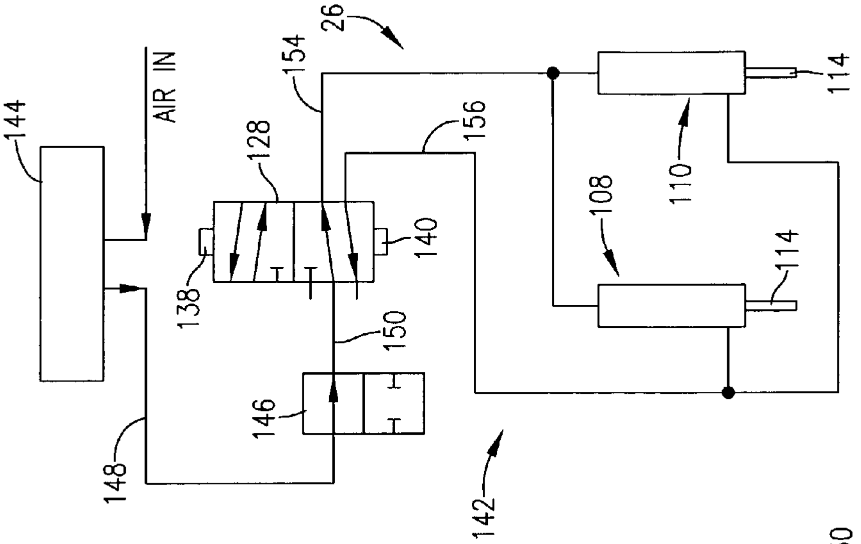
FIG. 9 is a schematic flow diagram illustrating the interconnection between the valve assembly and the piston and cylinder assemblies forming a part of the drive.
Figure 10:
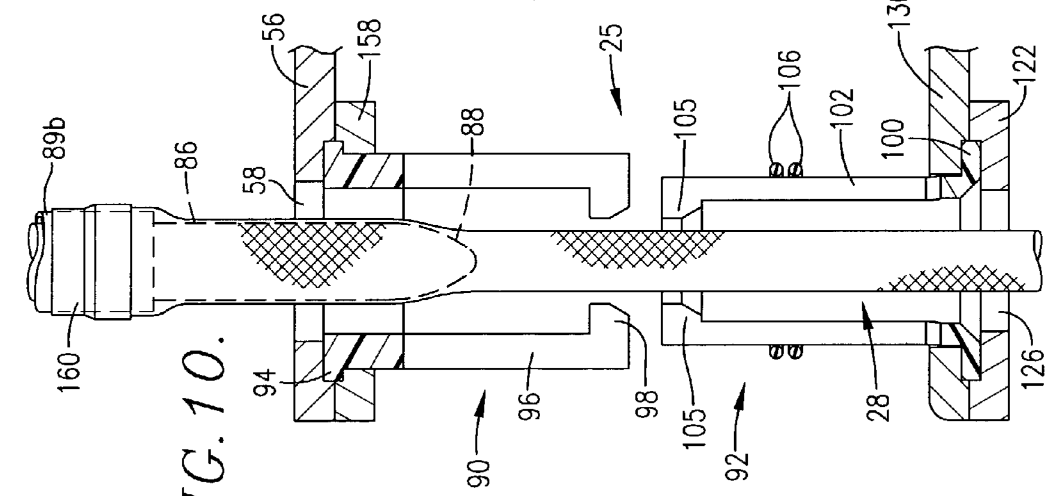
FIG. 10 is an enlarged, sectional view illustrating positioning of the support rod and flexible tubular body to be pleated, with the latter extending through the open pleating jaws prior to a pleating operation.
Figure 11:
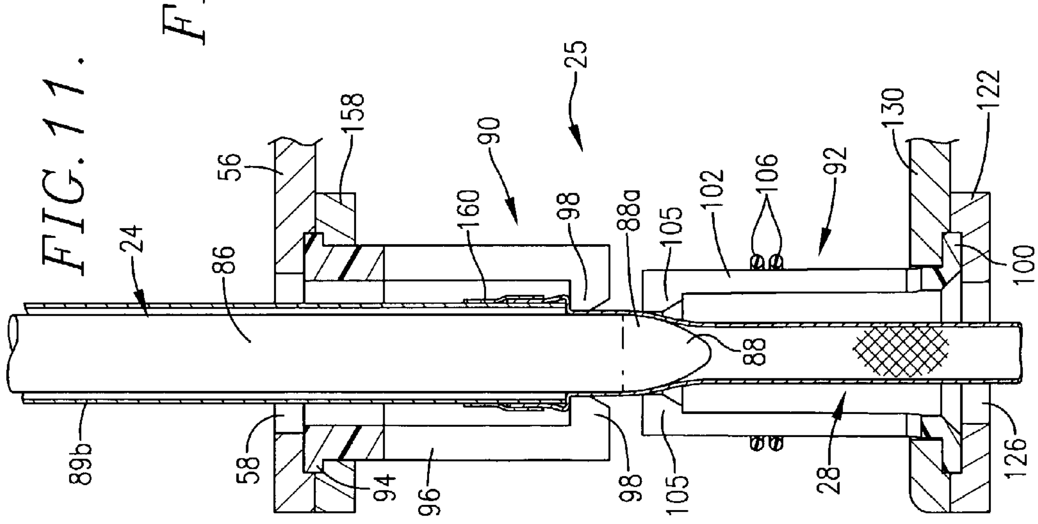
FIG. 11 is a sectional view similar to that of FIG. 10, but illustrating the support rod and tubular body in a pleating position.

Pneumatic control circuitry 142 is provided to properly interconnect directional valve 128 and the piston and cylinder assemblies 108, 110. Such circuitry is schematically illustrated in FIG. 9 and includes manual safety valve 144 and on-off pneumatic switch 146. A first conduit 148 extends from pump 144 to the input of switch 146, and a second conduit 150 extends from the switch output to the directional valve input 152. Two branched valve output lines 154, 156 extend from the output of the directional valve and are respectively coupled to the upper and lower ends of the assemblies 108, 110.

As best illustrated in FIGS. 10–14, the lower male jaw 92 is clamped between cross plate 122 and bracket 130, i.e., the base 100 is received within corresponding annular recesses formed in the cross plate 122 and 130, so that the jaw 92 is positioned in an upright orientation in axial alignment with the openings 126 and 132. Similarly, the upper jaw 90 is clamped between the recessed underside of T-shaped plate 56 and annular clamping plate 158, so that the jaw 90 is in registry with central opening 60.

The purpose of drive assembly 26 is to rapidly reciprocate cross plate 122, thereby vertically shifting valve 128 and lower jaw 92. Thus, when directional valve 128 is in the FIG. 9 position thereof, pressurized air is delivered via line 154 to the assemblies 108, 110, thereby serving to extend the rods 114 while air is exhausted from the corresponding port 136, and simultaneously lowering cross plate 122 and lower male jaw 92. When the rods 114 reach their lowest extent, valve pin 140 of directional valve 128 engages stop 45, causing the directional valve 128 to shift and deliver pressurized air via output line 156 to the bottoms of the assemblies 108, 110. This of course retracts the piston rods 114, causing cross plate 122 and jaw 92 to move upwardly until upper valve pin 138 comes into engagement with valve stop 64. In this fashion, the cross plate 122 and lower jaw 92 are rapidly moved in an up and down reciprocating fashion.

OPERATION

The operation of machine 20 will now be described in connection with pleating of tubular body 28 of flexible material, such as NOMEX. In the first step, the slide 89 is telescoped over section 86 of rod 82 and the upper end of tubular body 28 is telescoped onto the bullet end of the rod; a stretch of tape 160 is used to secure the upper end of the body 28 to the outer surface of tubular slide section 89*b* (see FIGS. 10 and 11). Next, the depending portion of body 28 is threaded downwardly through the open jaws 90, 92, i.e., it is passed through opening 58, upper female jaw 90, lower male jaw 92, opening 126 and ultimately through base openings 35, 33. At this point, the upper reduced diameter section 84 of rod 82 is secured within fitting 80, and the clamp 74 is manipulated so as to lock the rod 82 in place. This initial orientation of the rod is depicted in F*ig*. 11, where it will be seen that the rod passes through the lowermost opening of upper jaw 90 with in the extreme lower bullet end 80 passing into the confines of lower jaw 92 adjacent the engagement lugs 105.

Figures 12, 13, 14:
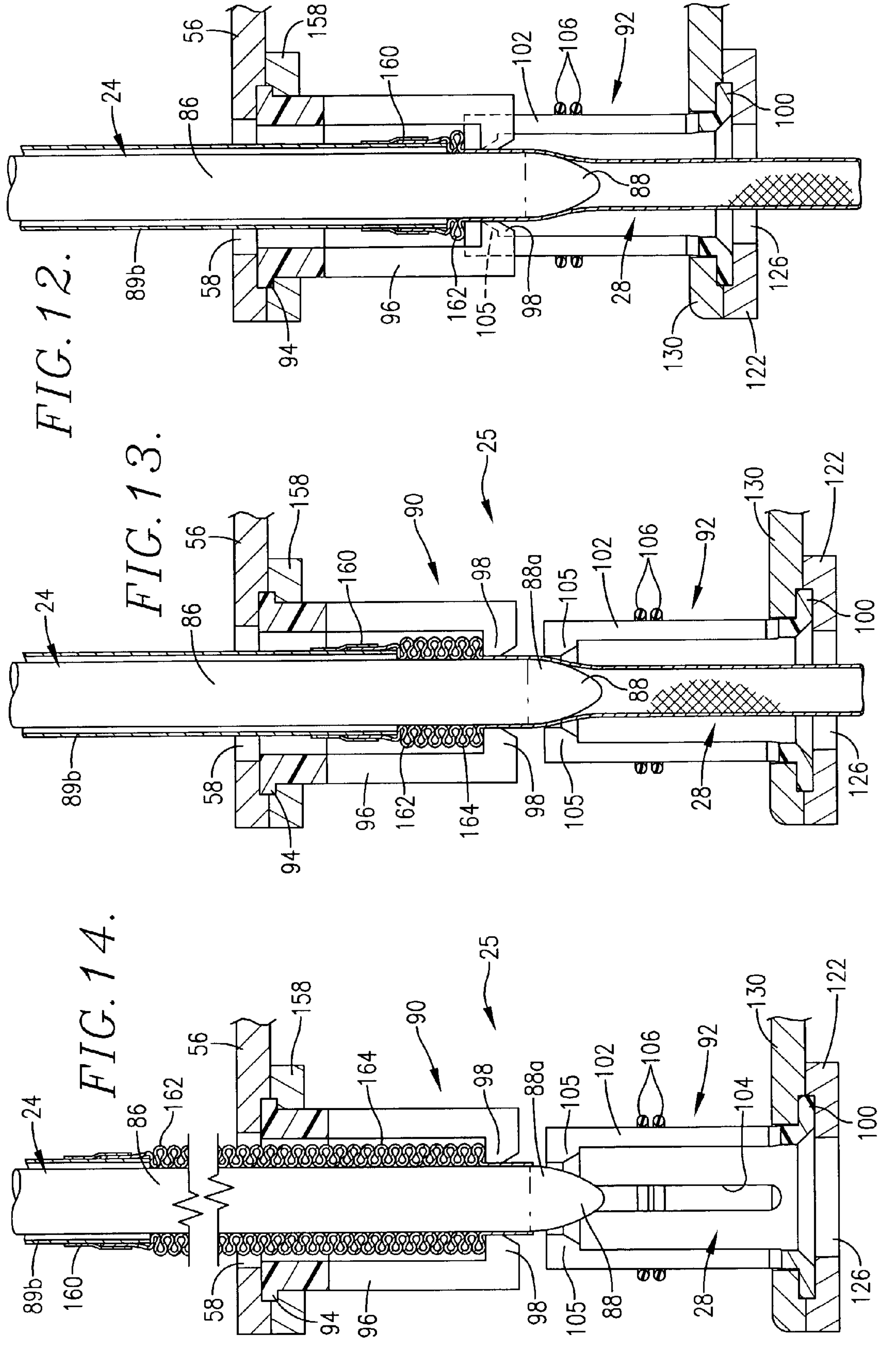
FIG. 12 is a view similar to that of FIG. 11, but illustrating the lower male jaw shifted upwardly to engage the tubular body so as to create an initial pleat.
FIG. 13 is a view similar to that of FIG. 12, but showing the lower jaw in its shifted away position from the upper female jaw during the course of pleating of the tubular body.
FIG. 14 is a view similar to that of FIG. 13, but illustrating the pleating jaws in their open position with the tubular body fully pleated.

The drive assembly 26 is then actuated in order to begin the pleating process. Referring to FIG. 12, it will be seen that as the lower jaw 92 is elevated, the lugs 105 come into frictional contact with the outer surface of tubular body 28 and, by virtue of the presence of the pleating surface 88*a*, an initial pleat 162 of material is formed and pushed upwardly past the keeper segments 98 and against the bias of slide 89. Upon retraction of the lower jaw 92, the initial pleat 162 is retained between the keeper segments 98 and the lower end of weighted slide segment 89*b*.

Referring now to FIGS. 13 and 14, it will be seen that continued up and down reciprocation of lower jaw 92 creates successive pleats 164, all of which are retained between the keeper structure cooperatively defined by the segments 98 and weighted slide 89. The pleating operation continues until substantially the entirety of the tubular body 28 is plated.

Attention is next directed to FIGS. 15–19 which illustrate how the pleated body 28 is applied to a synthetic resin tube 165. In particular, in the first step the support 24 is removed from the machine 20 by releasing the clamp 74 and detaching the upper end of rod section 84 from fitting 80. This is done carefully so as to prevent the lower end of the pleated body 28 from passing downwardly over bullet end 88.

Figures 15, 16, 17, 18, 19:
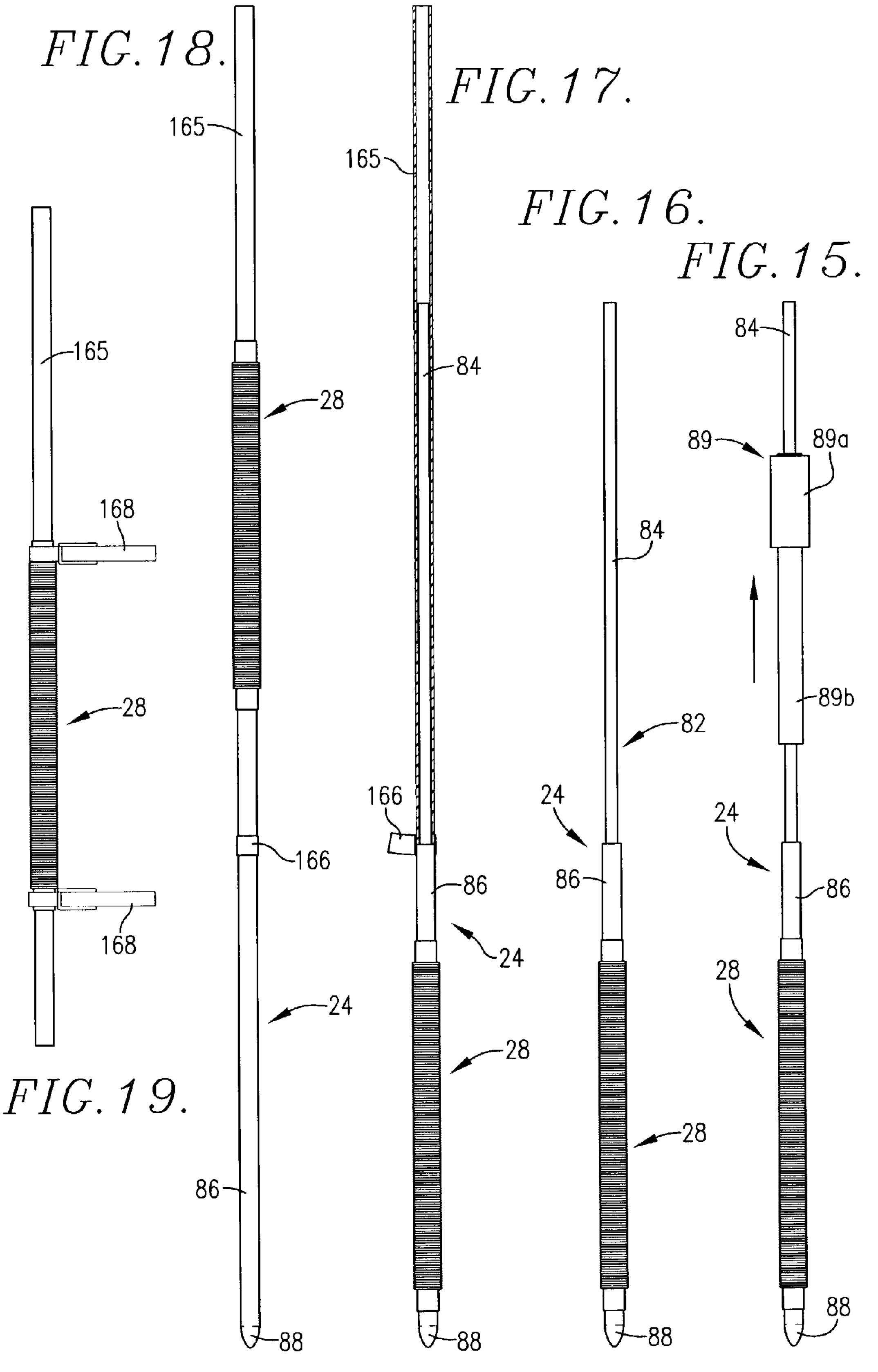
FIG. 15 is a sectional view depicting the elongated rod and finished pleated body removed from the pleating machine, prior to complete removal of the weighting tube.
FIG. 16 is a view similar to that of FIG. 15, but illustrating the weighting tube removed.
FIG. 17 is a view similar to that of FIG. 16, but showing the placement of a synthetic resin tube over the upper end of the rod, prior to placement of the pleated body thereover.
FIG. 18 is a sectional view similar to that of FIG. 17, but showing the finished pleated body shifted over the synthetic resin tube.
FIG. 19 is a sectional view depicting the synthetic resin tube with the pleated body thereon, with clamps used to hold the pleated body in place.

Next, the weighted slide 89 is removed from the support 24 leaving the pleated body 28 in place as shown in FIG. 16. At this point, the tube 164 is telescoped over reduced diameter upper section 84 of rod 82, and is temporarily secured thereto by tape 166. At this point, the entire pleated section 28 is slid upwardly along the length of the rod over the tube 165 until it assumes the position of 118. Finally, the upper and lower ends of the pleated body 28 are temporarily secured to tube 165 by clamps 168, and the tube 165 is then removed from the rod 82. The assembly of the tube 165 with the pleated body 28 telescoped thereover can then be used in the manufacture of an aviation mask or the like.

We claim:

1. A pleating machine operable for pleating an elongated, flexible tubular body, said machine comprising:

a jaw assembly having opposite first and second ends and including a pair of tubular pleating jaws in substantial axial alignment, each of said jaws including a tubular base, a plurality of body-engaging elements, and axially extending, elongated support structure interconnecting the tubular base and said elements in order to thereby orient the elements in axially spaced relationship to the base, the base of one of said jaws being adjacent the first end of said jaw assembly, and the base of the other of said jaws being adjacent the second opposite end of the jaw assembly, said jaw bases being axially spaced apart a distance greater than the axial length of either of said jaw support structures;

a support operable to maintain the tubular body in a pleating position passing through said pleating jaws; and a drive assembly operably coupled with said jaw assembly for generating relative reciprocal movement between the jaws in order to successively engage said body and form pleats therein, there being keeper structure operable to retain said pleats upon formation thereof.

2. The machine of claim 1, said jaws including a male jaw and a female jaw, said female jaw including inwardly extending segments forming a part of said keeper structure.

3. The machine of claim 2, said female jaw member being stationary, with said male jaw member being shiftable relative thereto in order to generate said relative reciprocal movement.

4. The machine of claim 2, said female jaw being located above said male jaw.

5. The machine of claim 1, said support comprising an elongated rod member presenting a pleating surface, said rod member adapted to support said body with said pleating surface located adjacent said pleating jaws.

6. The machine of claim 5, said jaws being located in a superposed upright orientation, said rod extending downwardly through the upper jaw.

7. The machine of claim 5, including a tubular weighting member forming a part of said keeper structure and slidably disposed on said rod and spaced from said pleating surface, said weighting member oriented to engage said body during formation of said pleats and to assist in retention of said pleats.

8. The machine of claim 1, said drive assembly including at least one piston and cylinder assembly operably coupled with one of said jaws.

9. The machine of claim 8, said drive assembly including a plate operably coupled to said one jaw, with a pair of spaced apart piston and cylinder assemblies operably attached to said plate.

10. The machine of claim 8, said drive assembly further including a pair of spaced apart stop surfaces, there being a control valve shiftable in response to said reciprocal movement and to alternately engage said stop surfaces, said valve operable to change the direction of movement of said one jaw upon engagement with the stop surfaces.

11. The machine of claim 1, including a frame assembly supporting said jaw assembly, said support and said drive assembly.

12. The machine of claim 11, said frame assembly including a base, a plurality of spaced apart upright standards operably secured to said base, and a mount for said body support secured to said standards above said jaw assembly.

13. The machine of claim 11, said base assembly including vibration dampening mechanism.

14. The machine of claim 1, said support structure for each of said jaws comprising a plurality of circumferentially spaced apart, elongated support legs.

15. A pleating machine operable for pleating an elongated, flexible tubular body, said machine comprising:

jaw means having opposite first and second ends and including a pair of tubular pleating jaws in substantial axial alignment, each of said jaws including a tubular base, a plurality of body-engaging elements, and axially extending, elongated support structure interconnecting the tubular base and said elements in order to thereby orient the elements in axially spaced relationship to the base, the base of one of said jaws being adjacent the first end of said jaw assembly, and the base of the other of said jaws being adjacent the second opposite end of the jaw assembly, said jaw bases being axially spaced apart a distance greater than the axial length of either of said jaw support structures;

means operable to maintain the tubular body in a pleating position passing through said pleating jaws; and means operably coupled with said jaw means for generating relative reciprocal movement between the jaws in order to successively engage said body and form pleats therein, means oriented for retaining said pleats upon formation thereof.

16. The machine of claim 15, said jaws including a male jaw and a female jaw, said female jaw including inwardly extending segments forming a part of said pleat-retaining means.

17. The machine of claim 16, said female jaw member being stationary, with said male jaw member being shiftable relative thereto in order to generate said relative reciprocal movement.

18. The machine of claim 16, said female jaw being located above said male jaw.

19. The machine of claim 16, said body-maintaining means comprising an elongated rod member presenting a pleating surface, said rod member adapted to support said body with said pleating surface located adjacent said pleating jaws.

20. The machine of claim 19, said jaws being located in a superposed upright orientation, said rod extending downwardly through the upper jaw.

21. The machine of claim 19, including a tubular weighting member slidably disposed on said rod spaced from said pleating surface, said weighting member oriented to engage said body during formation of said pleats and to assist in retention of formed pleats.

22. The machine of claim 15, said movement-generating means including at least one piston and cylinder assembly operably coupled with one of said jaws.

23. The machine of claim 22, said movement-generating means including a plate operably coupled to said one jaw, with a pair of spaced apart piston and cylinder assemblies operably attached to said plate.

24. The machine of claim 22, said movement-generating means further including a pair of spaced apart stop surfaces, there being a control valve shiftable in response to said reciprocal movement and to alternately engage said stop surfaces, said valve operable to change the direction of movement of said one jaw upon engagement with the stop surfaces.

25. The machine of claim 15, including frame means supporting said jaw means said support and said drive means.

26. The machine of claim 25, said frame means including a base, a plurality of spaced apart upright standards operably secured to said base, and a mount for said body support secured to said standards above said jaw means.

27. The machine of claim 26, said base assembly including vibration dampening mechanism.

28. The machine of claim 15, said support structure for each of said jaws comprising a plurality of circumferentially spaced apart, elongated support legs.

* * * * *